United States Patent
Jung et al.

(10) Patent No.: US 6,927,827 B2
(45) Date of Patent: Aug. 9, 2005

(54) LIQUID CRYSTAL DISPLAY WITH LIQUID CRYSTAL LAYER, ALIGNING LAYERS, AND OVERCOAT LAYER HAVING ADJUSTED DIELECTRIC PERMITIVITY AND RESISTIVITY

(75) Inventors: Cheol-Soo Jung, Cheonan (KR); Keon-Kook Han, Ansan (KR); Young-Kuil Joo, Cheonan (KR); Ji-Young Ko, Cheonan (KR); Young-Hwan Cho, Cheonan (KR); Kyoung-Woo Min, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 62 days.

(21) Appl. No.: 10/398,480
(22) PCT Filed: Aug. 6, 2002
(86) PCT No.: PCT/KR02/01494
§ 371 (c)(1),
(2), (4) Date: May 22, 2003
(87) PCT Pub. No.: WO03/014815
PCT Pub. Date: Feb. 20, 2003

(65) Prior Publication Data
US 2004/0012741 A1 Jan. 22, 2004

(51) Int. Cl.⁷ .................... G02F 1/1333; C02K 19/02
(52) U.S. Cl. .................... 349/138; 349/123; 349/167
(58) Field of Search ................ 349/123, 138, 349/167

(56) References Cited

U.S. PATENT DOCUMENTS

| | | | | |
|---|---|---|---|---|
| 5,600,464 A | * | 2/1997 | Ohe et al. | 349/123 |
| 6,040,887 A | * | 3/2000 | Matsuyama et al. | 349/141 |
| 2004/0066480 A1 | * | 4/2004 | Yoshida et al. | 349/123 |

OTHER PUBLICATIONS

Bahadur, Liquid Crystal Applications and Uses, vol. 1, 1990, pp. 139–151.*

* cited by examiner

Primary Examiner—Andrew Schechter
(74) Attorney, Agent, or Firm—McGuireWoods LLP

(57) ABSTRACT

The present invention relates to a liquid crystal display. The relation of ∈ (permittivity). sg(r) (resistivity) between a liquid crystal layer, an aligning layer or an overcoat for preventing poor images is established. An LCD according to the present invention includes a first panel including a plurality of devices thereon and an aligning layer formed on the entire surface thereof, a second panel opposite to the first panel and including an overcoat and an aligning layer sequentially formed on the entire surface thereof, and a liquid crystal layer interposed between the first pane) and the second panel. It is preferable that the aligning layer, the liquid crystal layer and the overcoat satisfy the relation (a). An LCD according to another embodiment includes a first panel including a plurality of devices thereon and an aligning layer formed on the entire surface thereof, a second panel opposite to the first panel and including an overcoat and an aligning layer sequentially formed on the entire surface thereof, and a liquid crystal layer interposed between the first panel and the second panel. It is preferable that the liquid crystal and the overcoat satisfy the relation (b).

4 Claims, 10 Drawing Sheets

LIQUID CRYSTAL DISPLAY WITH LIQUID CRYSTAL LAYER, ALIGNING LAYERS, AND OVERCOAT LAYER HAVING ADJUSTED DIELECTRIC PERMITIVITY AND RESISTIVITY

BACKGROUND OF THE INVENTION (a) Field of the Invention

The present invention relates to a liquid crystal display, and in particular to a coplanar electrode ("CE") type liquid crystal display and a manufacturing method thereof.

(b) Description of the Related Art

A coplanar electrode ("CE") type liquid crystal display ("LCD") includes a plurality of pixel electrodes and a plurality of common electrodes provided on one panel. The CE type LCD drives liquid crystal molecules using horizontal electric field nearly parallel to the panel between the pixel electrode and the common electrodes, thereby realizing wide viewing angle.

In the CE type LCD, a plurality of pixel areas defined by intersections of a plurality of gate lines and a plurality of data lines are formed in a matrix form on a thin film transistor ("TFT") array panel. Each of pixel areas includes a switching element electrically connected to one of the gate lines and one of the data lines, a pixel electrode electrically connected to the switching element and a common electrode opposite each other and extending nearly parallel to the pixel electrode to form horizontal electric field.

On a color filter panel opposite to the TFT array panel, a plurality of color filters of red color R, green color G or blue color B are provided in pixel areas, and a black matrix for blocking light leakage between the pixel areas is provided and an overcoat is formed thereon.

In such an LCD, deterioration of image quality due to vertical bouncing becomes a serious problem. The vertical bouncing means that the electric field applied to a liquid crystal layer for driving the LCD is dynamically distorted around 60 Hz, which is driving frequency of the LCD, due to a certain reason, and the liquid crystal molecules are moves under the influence of the distorted electric field. This vertical bouncing appears as flicker of screen to deteriorate image quality.

SUMMARY OF THE INVENTION

An object of the present invention is to prevent poor images of an LCD.

To accomplish the object, the relation of $\in$ (permittivity) ·ρ (resistivity) between a liquid crystal layer, an aligning layer or an overcoat for preventing poor images is established so that the bouncing dose not appear.

In detail, an LCD according to an embodiment of the present invention includes a first panel including a plurality of devices thereon and an aligning layer formed on the entire surface thereof, a second panel opposite to the first panel and including an overcoat and an aligning layer sequentially formed on the entire surface thereof, and a liquid crystal layer interposed between the first panel and the second panel. It is preferable that the aligning layer, the liquid crystal layer and the overcoat satisfy the relation $$\frac{\rho \varepsilon_{lc+al}}{\rho \varepsilon_{oc}} > 10^2.$$

Preferably, the first panel further includes a pixel electrode and a common electrode opposite to the pixel electrode.

An LCD according to another embodiment of the present invention includes a first panel including a plurality of devices thereon and an aligning layer formed on the entire surface thereof, a second panel opposite to the first panel and including an overcoat and an aligning layer sequentially formed on the entire surface thereof, and a liquid crystal layer interposed between the first panel and the second panel. It is preferable that the liquid crystal and the overcoat satisfy the relation $$\frac{RC_{lc}}{RC_{oc}} > 10^3.$$

Preferably, the first panel further includes a pixel electrode and a common electrode.

DETAILED DESCRIPTION OF PREFERRED EMBODIMENTS

Now, the present invention will be described in detail with reference to the accompanying drawings.

Figure 1:
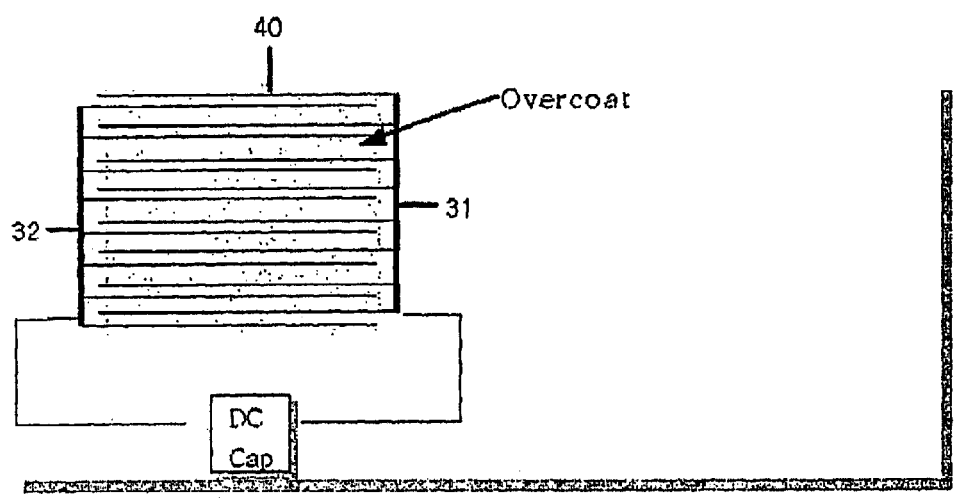
FIG. 1 illustrates an effective capacitive dielectric region in a normal LCD.
Figure 2:
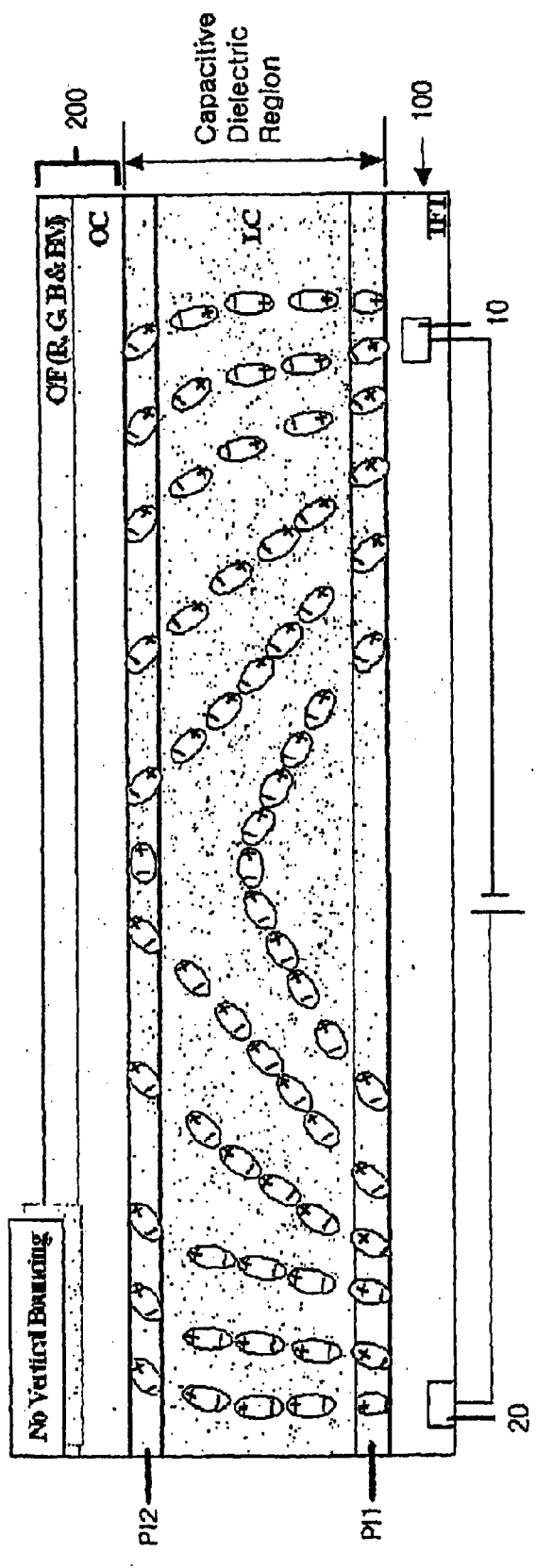
FIG. 2 illustrate effective capacitive dielectric region in an LCD where a vertical bouncing appears.

FIGS. 1 and 2 schematically illustrate LCDs. FIG. 1 illustrates an effective capacitive dielectric region in a normal LCD and FIG. 2 illustrates an effective capacitive dielectric region in an LCD where bouncing appears.

As described above, in a CE type LCD, a liquid crystal layer LC is disposed between a TFT array panel 100 including a pixel electrode 10 and a common electrode 20 opposite thereto and a color filter panel including a color filter CF and an overcoat OC. A first and a second aligning layer PI1 and PI2 for determining the alignment of the liquid crystal are coated on the TFT array panel 100 and the color filter panel 200.

Since the pixel electrode 10 and the common electrode 20 are formed on the same panel, the electric field generated therebetween forms an oval curve with respect to the panel 100, and this aligns the liquid crystal molecules as shown in FIGS. 1 and 2.

As shown in FIG. 1, a effective capacitive dielectric region of a normal LCD is a region between the first aligning layer PI1 and the second aligning layer PI2 including the liquid crystal layer LC. The overcoat OC does not play a part of a capacitive dielectric for electric field applied to the LCD.

Examples of main materials forming the overcoat of an LCD are an acryl-based resin and an epoxy resin, a curing agent. These materials have resistance ranging several kΩ to hundreds of kΩ, which may not work as an organic insulating layer sufficiently. Thus, the surface of the overcoat is filled with charges by the electric field applied to the LCD so that the electric field cannot penetrate into the inside of the overcoat. The overcoat does not work as a dielectric of capacitor.

In the meantime, the resistance of the overcoat increases through wet processes such as alkali cleaning or ultra pure water cleaning. The increased resistance increases the charging time of charges onto the surface of the overcoat due to the electric field applied to the LCD, thereby making the overcoat work as a capacitive dielectric for a moment. In addition, the dielectric constant of a dielectric is changed to vary the capacitance during the charging. This variation of capacitance induces the variation of the liquid crystal alignment to cause bouncing appearing as a screen flickering In detail, a ultra-violet ("UV") treatment decomposes organic material of the surface of the overcoat to generate impurity such as acids. The penetration of organic adsorbent such as tetramethylammonium, hydroxide ("TMAH") or water used for the process of forming the aligning layers changes electrical characteristics of the overcoat, thereby distorting the electric field applied to the LCD.

In other words, after forming the overcoat, the impurities are penetrated into polymers composing the unstable overcoat during the cleaning process. As a result, the charge carrier mobility of the overcoat is decreased and the resistance of the overcoat is increased so that the overcoat also works as capacitive dielectric together with the liquid crystal.

Considering this effect, the effective capacitive dielectric region of a liquid crystal capacitor in the LCD, as shown in FIG. 2, becomes a region between the first aligning layer PI1 and the second aligning layer PI2 including the liquid crystal layer LC as well as the overcoat OC. As a result, the electric field applied to the LCD is distorted, and flicker appears until the distorted field is stabilized.

Now, the relation between the variation of the resistance of an overcoat and the charging ratio of the field is described with reference to an experiment.

First, the variation of the resistance of an overcoat and the variation of a capacitance was measured using TMAH and pure water.

Figure 3:
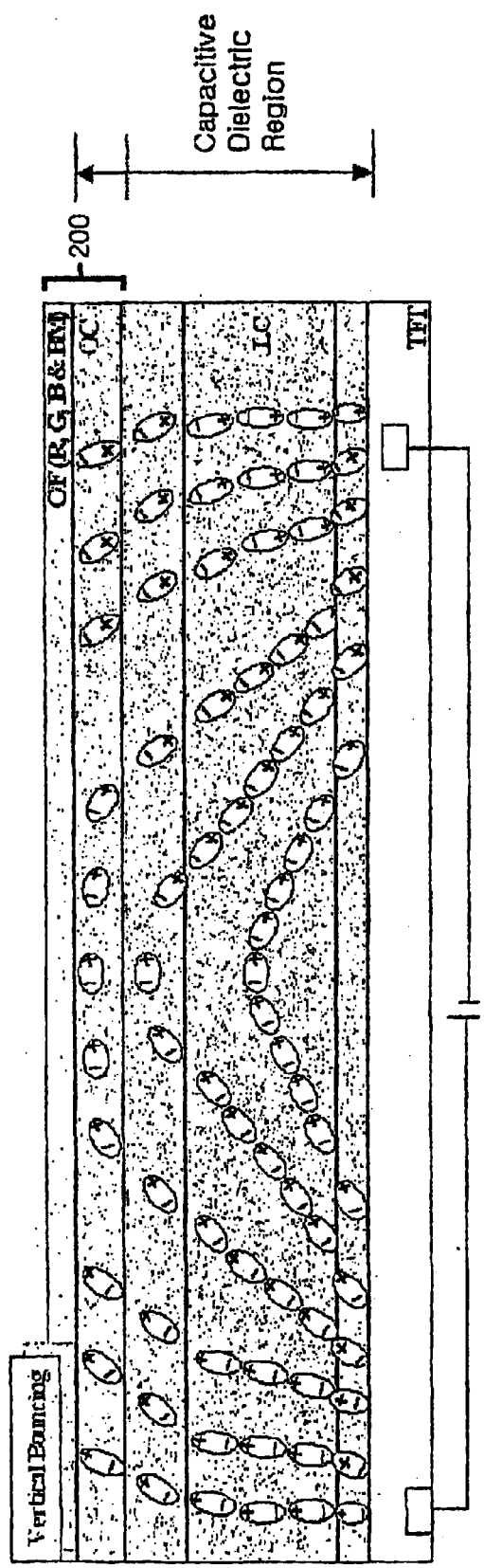
FIG. 3 schematically illustrates a system for measuring electrical characteristics of an overcoat.

The experimental condition prepared for measurement is shown in FIG. 3.

FIG. 3 schematically illustrates a structure of a panel for the measurement of the electrical characteristics of an overcoat.

A pair of electrodes 31 and 32 for the measurement of the electrical characteristic was formed by depositing and patterning a Cr/Al alloy layer with 2,500 Å thickness. The length of the electrodes 31 and 32 was 33.8 cm, and the distance between the electrodes 31 and 32 was 10.28 µm.

After forming an overcoat 40 on the above described electrodes 31 and 31, the surface of the overcoat was not treated or was treated by UV and ozone depending on the experimental condition. Thereafter, the overcoat 40 was wetted in TMAH solution or pure water at respective times, and then, the resistance R and the capacitance C of the overcoat 40 were measured.

Figure 4:
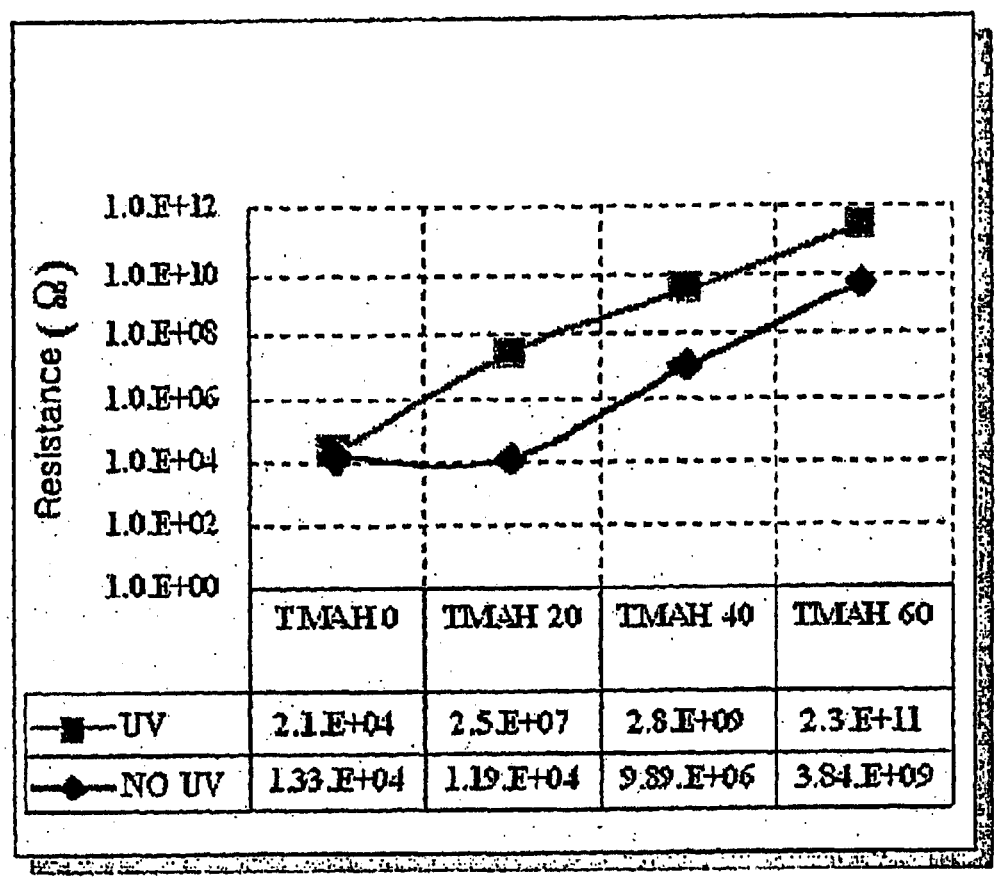
FIG. 4 is a graph illustrating the resistances of TMAH-treated overcoats as function of the treatment times.
Figure 5:
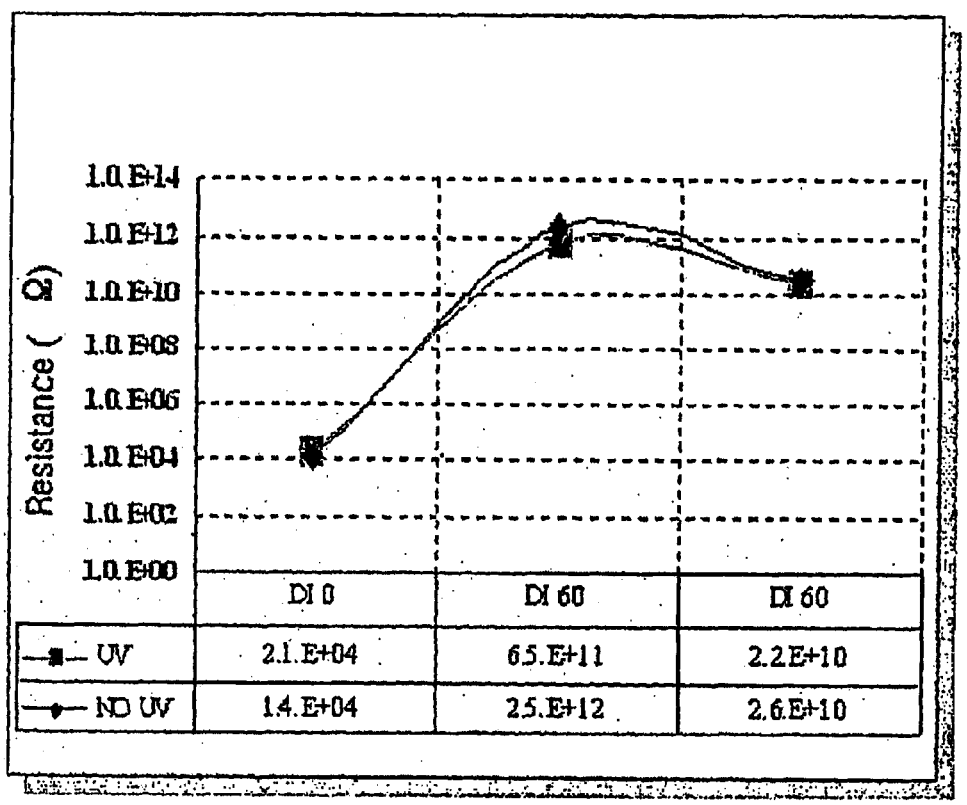
FIG. 5 is a graph illustrating the resistances of pure-water-treated overcoat as function of treatment times.

FIG. 4 is a graph illustrating the resistances of TMAH-treated overcoats as function of treatment times, and FIG. 5 is a graph illustrating the resistances of pure-water-treated overcoats as function of treatment times.

Among the pure-water-wetted overcoats, there was no difference in the resistances of the UV-treated overcoats and the overcoats that did not experience UV treatment. In contrast, among the TMAH-wetted overcoats, the resistances of the UV-treated overcoats were larger than those of the overcoats which did not experience UV treatment.

When an organic film is subject to UV treatment, its surface is deformed. The UV treatment results in the release of fatty carbonic bonds, and ozone or oxygen is chemically adsorbed in the released bond. As a result, the surface of the overcoat has a hydrophility.

Then, when cleaning the overcoat using TMAH, ion impurity is physically and chemically adsorbed on the surface of the overcoat, thereby decreasing the mobility of the electrical charge carriers and increasing the resistance of the overcoat.

Accordingly, the UV-treated and TMAH-cleaned overcoats show drastically different resistances as shown in FIG. 4.

Table 1 illustrates the measured resistances R and the measured capacitances C of overcoats under the respective conditions in order to examine the effect of TMAH treatment depending on UV treatment.

| TMAH Treatment Time (minutes) | R (Ω) No UV | R (Ω) UV | C (pF) No UV | C (pF) UV | RC Delay No UV | RC Delay UV |
|---|---|---|---|---|---|---|
| 0  | 1.33E+04 | 2.1E+04  | 100.0 | 123.5 | 1.33E+06 | 2.59E+06 |
| 20 | 1.19E+04 | 2.5E+07  | 223.5 | 2.7   | 2.66E+06 | 6.75E+07 |
| 40 | 9.89E+06 | 2.8E+09  | 13.0  | 44.0  | 1.29E+04 | 1.23E+11 |
| 60 | 3.84E+09 | 2.3E+11  | 74.7  | 74.7  | 2.87E+11 | 3.91E+12 |

The resistances of the UV-treated overcoats are larger than those of the overcoats which did not experience UV treatment. Furthermore, the overcoats with longer TMAH time had larger resistances regardless of UV treatment.

Meanwhile, the increase of the resistance of the overcoat works as main factor of RC delay for the field applied to the liquid crystal layer.

Figure 6:
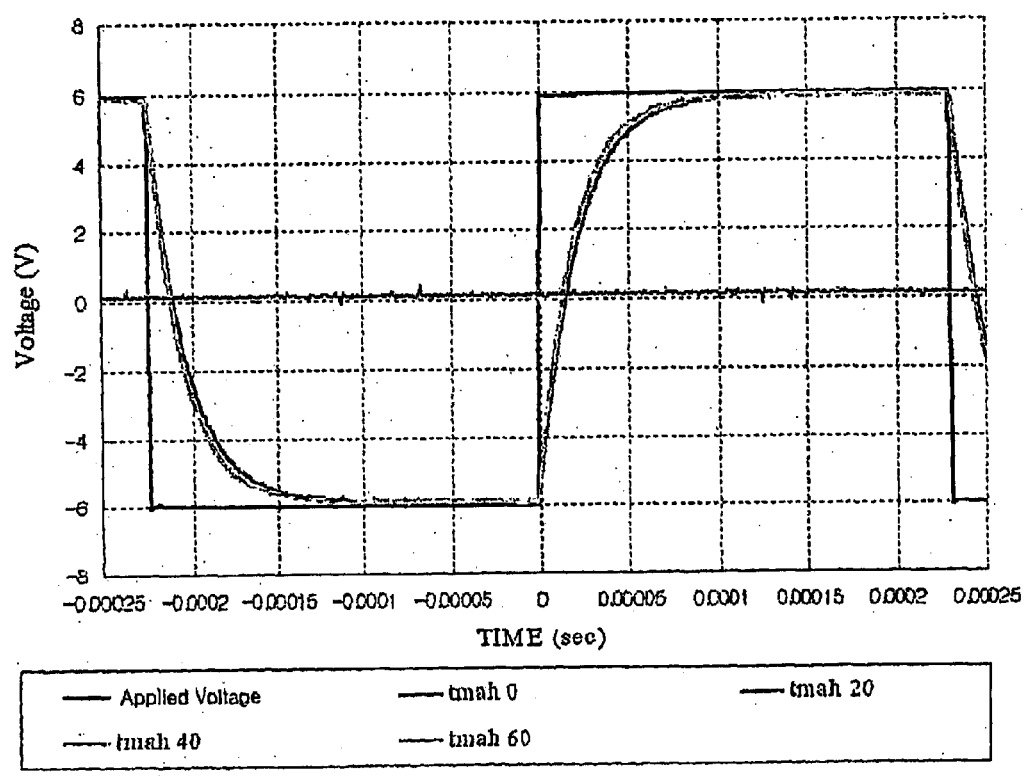
FIG. 6 is a graph illustrating the charged voltage as function of time for respective TMAH treatment times of overcoats which did not experience UV treatment.
Figure 7:
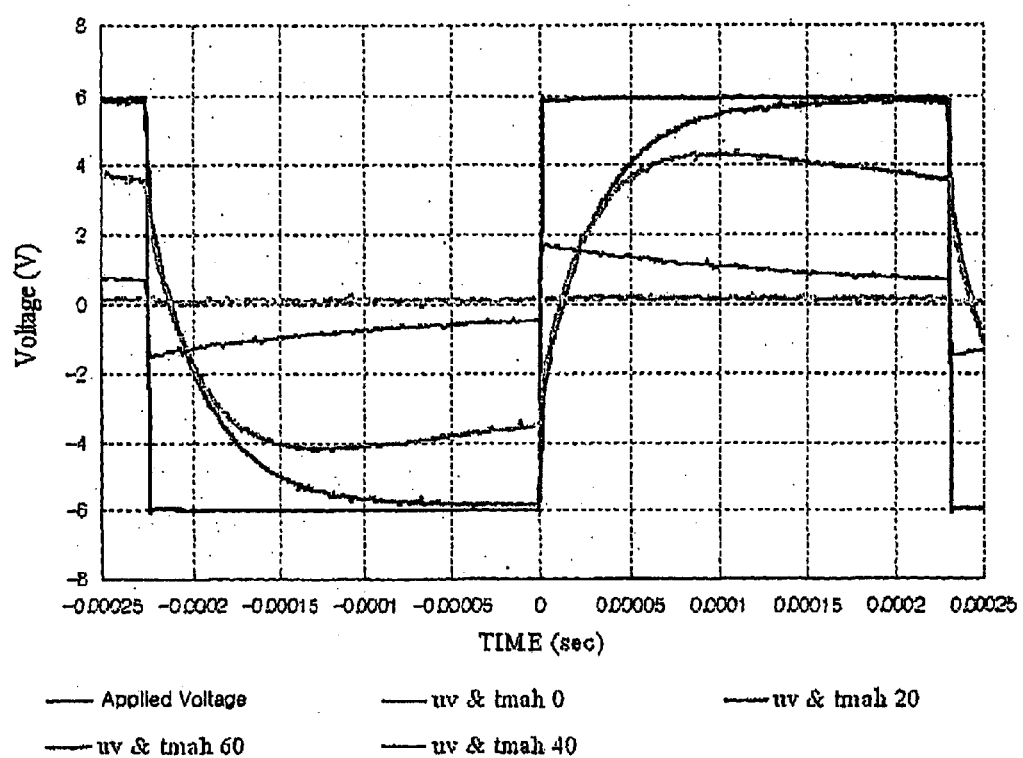
FIG. 7 is a graph illustrating the charged voltage as function of time for respective. TMAH treatment times of UV-treated overcoats.

FIG. 6 is a graph illustrating the charged voltage as function of time for respective TMAH treatment times of overcoats which did not experience UV treatment, and FIG. 7 is a graph illustrating the charged voltage as function of time for respective TMAH treatment times of UV-treated overcoats.

The charging times to an expected voltage for the overcoats which did not experience UV treatment were relatively short.

However, an expected voltage for the UV-treated overcoats was obtained after relatively long times elapsed. This is the case as the TMAH treatment time becomes longer. Like this, a stable voltage for a TMAH-treated overcoat is expected to be obtained after a predetermined time elapses. Thus indicates the same result as the Table 1.

To verify this result, the resistances and the charged voltages before and after TMAH cleaning, which is performed prior to formation of aligning layers, were measured.

Figure 8:
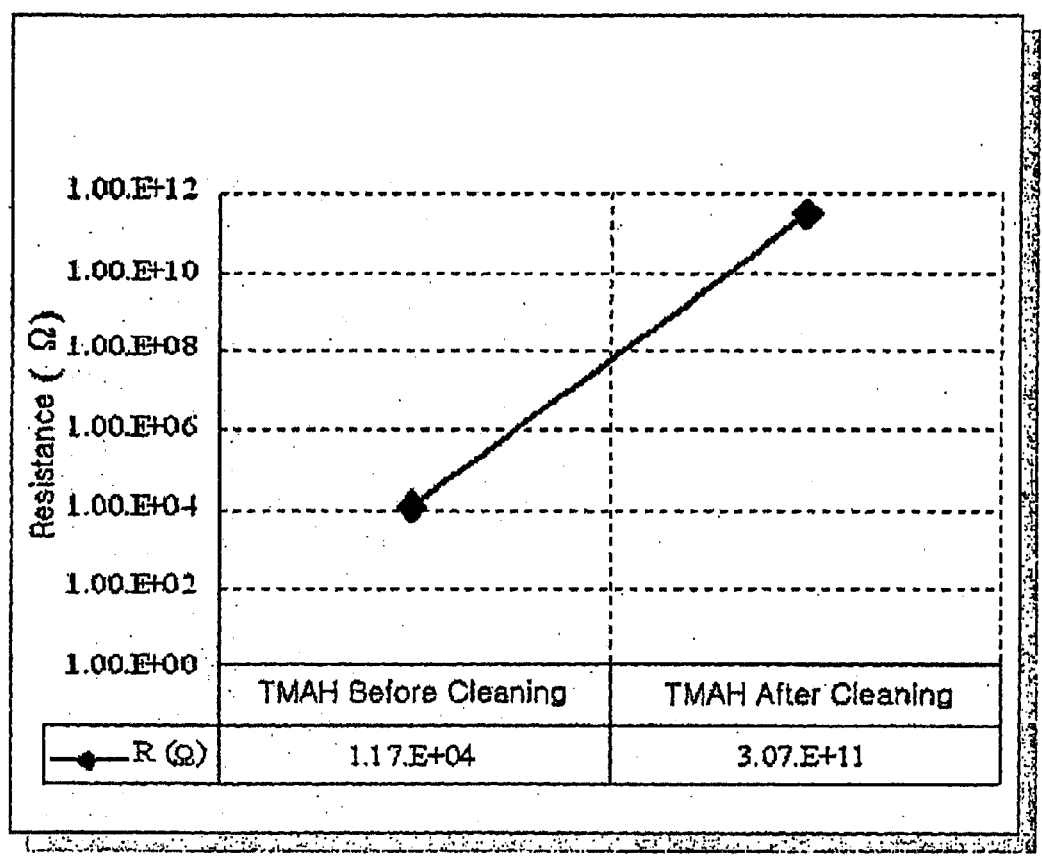
FIG. 8 is a graph illustrating the resistances of an overcoat before and after TMAH cleaning.

FIG. 8 is a graph illustrating the resistances of an overcoat before and after TMAH cleaning.

As expected, the resistance of the overcoat after the TMAH cleaning is increased.

Figure 9:
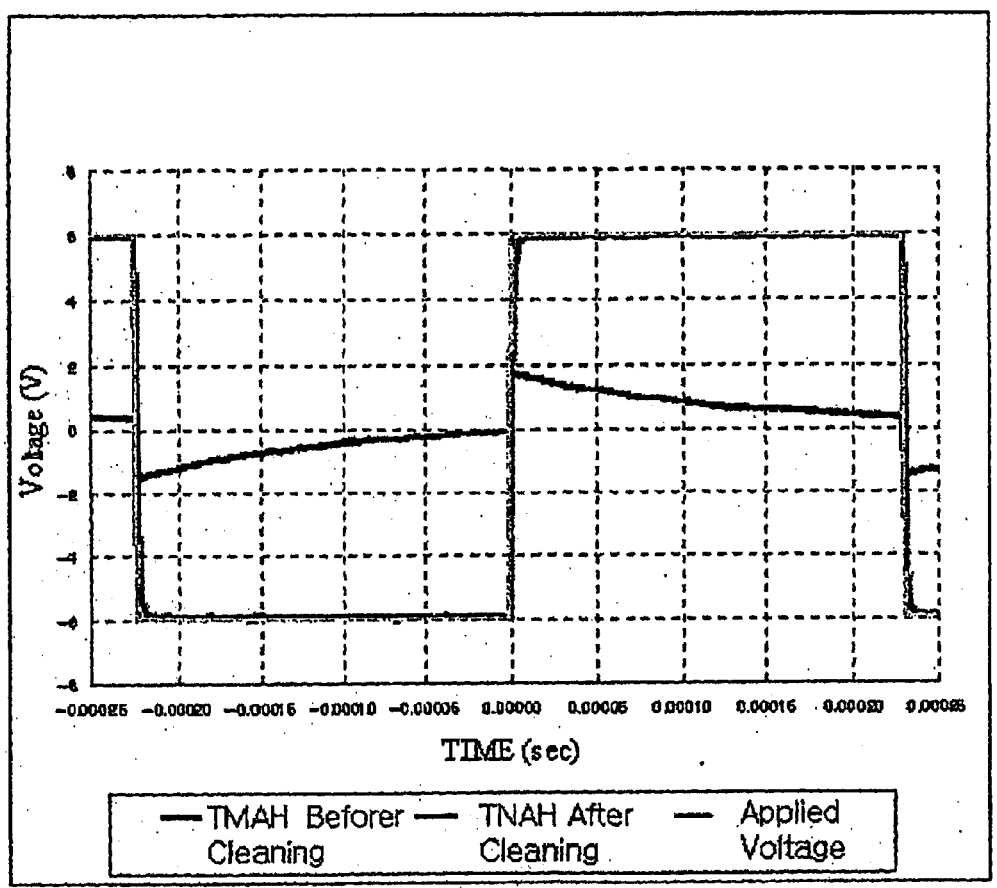
FIG. 9 is a graph illustrating the charged voltages as function of time for an overcoat before and after TMAH cleaning.

FIG. 9 is a graph illustrating the charged voltages as function of time for an overcoat before and after TMAH cleaning.

The charged voltage before the TMAH cleaning of the overcoat was almost the same as an applied voltage, while the charged voltage after the TMAH cleaning of the overcoat was very different from the applied voltage. It can be seen that this results from the increase of the resistance of the overcoat after the TMAH cleaning.

To review the results, it can be certified again that the physical and chemical characteristics of the surface of the overcoat are changed by TMAH treatment, thereby decreasing the mobility of the electrical charge carriers and increasing the resistance, thereby decreasing the charging ratio.

Figure 10:
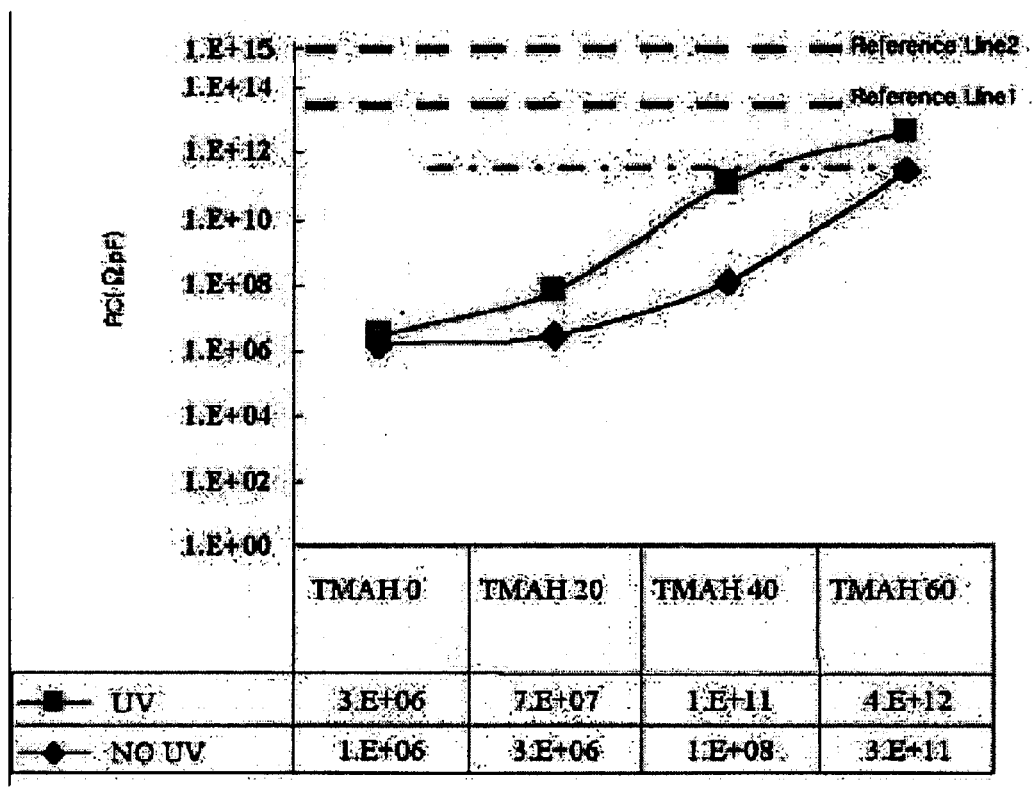
FIG. 10 is a graph illustrating RC value of overcoats as function of TMAH treatment time.

FIG. 10 is a schematic graph illustrating RC value of overcoats as function of TMAH treatment time shown in Table 1. In this graph, a reference line 1 refers to an RC value of a liquid crystal layer and an aligning layer and a reference line 2 refers to an RC value of a liquid crystal layer.

A panel with a liquid crystal layer and an aligning layer similar to the panel shown in FIG. 3 for measuring the electrical characteristics of an overcoat was obtained by forming the liquid crystal layer and the aligning layer in sequence instead of forming the overcoat. The RC value of the liquid crystal layer and the aligning layer indicated by the reference line 1 was then obtained by measuring R values and C values of the liquid crystal layer and the aligning layer. In addition, the RC value of a liquid crystal layer is obtained by the same manner.

The bouncing appeared in case that a UV-treated overcoat was TMAH-treated for 40 minutes or longer, and in case that an overcoat that was not UV-treated was TMAH-treated for 60 minutes or longer. It can be seen that the bouncing in the LCD of the present experiment appears when the RC value of the overcoat is 1.0E12 (referred to as one dotted line in the figure).

Considering the bouncing appears due to the variation of the capacitive dielectric constants of a liquid crystal capacitor as described above, it is required to establish the relation of RC value of an overcoat and RC value of a liquid crystal layer or an aligning layer.

Referring to the graph shown in FIG. 10, it can be inferred that the bouncing appears in the following case:

$$\frac{RC_{lc+al}}{RC_{oc}} < 10^2 \qquad (1)$$

where "lc", "al" and "oc" are abbreviations of liquid crystal layer, aligning layer and overcoat, respectively. Also "lc+al" is an abbreviation for a substance consisting of the liquid crystal layer and the aligning layers.

Therefore, the relation for preventing the bouncing in an LCD is:

$$\frac{RC_{lc+al}}{RC_{oc}} > 10^2 \qquad (2)$$

Since $$R = \rho\frac{L}{A'} \text{ and } C = \varepsilon\frac{A}{d'}$$

$$R \times C = \rho\frac{L}{A} \times \varepsilon\frac{A}{d} = \rho\varepsilon.$$

Here, $\rho$ is resistivity, L is length, A is area, $\in$ is dielectric constant, and d is distance.

Accordingly, an overcoat, a liquid crystal layer and an aligning layer of an LCD according to an embodiment of the present invention satisfy the following relation:

$$\frac{\rho\varepsilon_{lc+al}}{\rho\varepsilon_{oc}} > 10^2 \qquad (3)$$

Furthermore, referring to the graph shown in FIG. 10, it can be seen that the bouncing appears in the following case:

$$\frac{RC_{lc}}{RC_{oc}} < 10^3 \qquad (4)$$

Therefore, the relation for preventing the bouncing in an LCD is:

$$\frac{RC_{lc}}{RC_{oc}} > 10^3 \qquad (5)$$

As a result, it is preferable that the materials satisfy the following relation:

$$\frac{\rho\varepsilon_{lc}}{\rho\varepsilon_{oc}} > 10^3 \qquad (6)$$

Referring to the above described relationship, the bouncing can be improved by decreasing $\rho\in$ of an overcoat or by increasing $\rho\in$ of a liquid crystal or aligning layers.

Table 2 illustrates the bouncing depending on the value of $\rho$ of a liquid crystal layer crystal layer used in an LCD.

TABLE 2

| No UV treatment | Bouncing |
|---|---|
| 1.0E+12 | Strong |
| 1.9E+13 | ↑ |
| 3.3E+13 | ↑ |
| 1.0E+14 | Weak |

As a result of evaluation of the bouncing in an LCD depending on $\rho$ of a liquid crystal layer, the bouncing disappeared as $\rho$ of the liquid crystal layer becomes larger. This is the data verifying the relations (3) and (4).

As described above, the present invention provides a relation of $\in$ (dielectric permittivity)·$\rho$ (resistivity) among a liquid crystal layer, an aligning layer or an overcoat for preventing poor image quality such as bouncing in an LCD.

An LCD according to an-embodiment of the present invention, has a structure with a first panel including a plurality of devices provided thereon and an aligning layer formed on the entire surface thereof, a second panel located opposite the first panel and including an overcoat and an aligning layer formed in sequence on the entire surface, and a liquid crystal layer interposed between the first panel and the second panel. The aligning layer, the liquid crystal layer and the overcoat satisfy $$\frac{\rho\varepsilon_{lc+al}}{\rho\varepsilon_{oc}} > 10^2,$$

or the liquid crystal layer and the overcoat satisfy $$\frac{RC_{lc}}{RC_{oc}} > 10^3.$$

In this way, the bouncing generated in an LCD can be decreased or eliminated.

As described above, according to the present invention, it is possible to prevent a poor image such as bouncing generated in an LCD by adjusting $\rho$ or $\varepsilon$ of an overcoat, a liquid crystal layer or an aligning layer used for the LCD.

What is claimed is:

1. A liquid crystal display comprising:

a first panel including a plurality of elements and an aligning layer formed on the elements;

a second panel facing the first panel and including an overcoat layer and an aligning layer; and a liquid crystal layer interposed between the first panel and the second panel, wherein the aligning layers, the liquid crystal layer and the overcoat layer satisfy $$\frac{\rho\varepsilon_{lc+al}}{\rho\varepsilon_{oc}} > 10^2,$$

wherein $\rho$ is resistivity, $\varepsilon$ is a dielectric constant, $\rho\varepsilon_{lc+al}$ is the product of $\rho$ and $\varepsilon$ of a substance consisting of the liquid crystal layer and the aligning layers and $\rho\varepsilon_{oc}$ is the product of $\rho$ and $\varepsilon$ of the overcoat layer.

2. The liquid crystal display of claim 1, wherein the elements comprise a pixel electrode and a common electrode.

3. A liquid crystal display, comprising:

a first panel including a plurality of elements and an aligning layer formed on the elements;

a second panel facing the first panel and including an overcoat layer and an aligning layer; and a liquid crystal layer interposed between the first panel and the second panel, wherein the liquid crystal layer and the overcoat layer satisfy $$\frac{RC_{lc}}{RC_{oc}} > 10^3,$$

wherein R is resistance and C is capacitance, $RC_{lc}$ is the product of R and C of the liquid crystal layer and $RC_{oc}$ is the product of R and C of the overcoat layer.

4. The liquid crystal display of claim 3, wherein the elements comprise a pixel electrode and a common electrode.

* * * * *